No. 769,289. PATENTED SEPT. 6, 1904.
A. P. ANDERSON.
ADHESIVE.
APPLICATION FILED JULY 11, 1902.
NO MODEL.
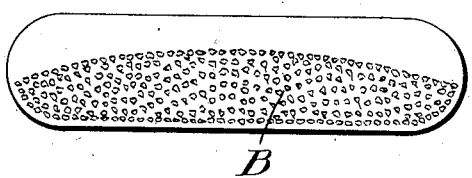
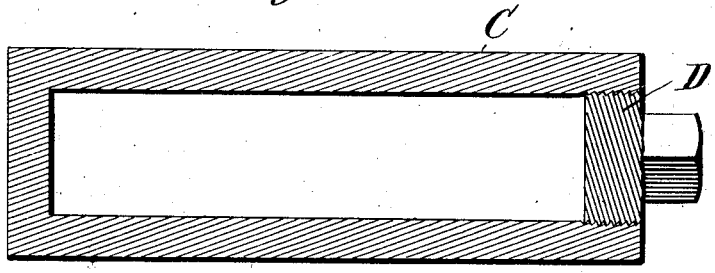
WITNESSES: INVENTOR
Alexander P. Anderson
BY
his Attorney.

No. 769,289. Patented September 6, 1904.

UNITED STATES PATENT OFFICE.

ALEXANDER PIERCE ANDERSON, OF BEDFORD PARK, NEW YORK.

ADHESIVE.

SPECIFICATION forming part of Letters Patent No. 769,289, dated September 6, 1904.

Application filed July 11, 1902. Serial No. 115,222. (No specimens.)

*To all whom it may concern:*

Be it known that I, ALEXANDER PIERCE ANDERSON, a citizen of the United States of America, residing at 629 One Hundred and Ninety-eighth street, Bedford Park, Bronx borough, in the city of New York, in the county and State of New York, have invented certain new and useful Improvements in Adhesives; and I do hereby declare the following to be a full, clear, and exact description of the invention, such as will enable others skilled in the art to which it appertains to make and use the same.

This invention relates to the art of preparing adhesives, such as pastes or sizes; and the object of the same is to simplify the manufacture of such pastes or sizes and to provide a dry adhesive which will be ready for use as a sizing or paste upon simply adding water to the same.

Pastes and sizes for laundry and other similar uses in the arts are commonly prepared by boiling flour or starch with water until the proper consistency is attained, the preparation of pastes and sizes in this way requiring considerable skill in order to obtain the same in the proper condition without lumps. Such paste is, moreover, subject to quick deterioration. It is, moreover, to be observed that paste when thus prepared must be immediately used, or at least very soon after preparation, as otherwise it will spoil or harden in part. Paste which has once hardened cannot be employed again, for the reason that it has lost its adhesive property, due to chemical and physical changes taking place within the same. These objections are overcome by an adhesive made according to my invention, for the reason that the same may be kept in a dry condition for an indefinite length of time and is at all times ready for conversion into a very effective adhesive or size upon the simple addition of water in the proper quantities.

My invention, briefly stated, consists in a dry adhesive made by subjecting substantially pure starch to heat above the boiling-point of water under pressure and thereupon suddenly reducing or removing the pressure, such dry adhesive presenting a swelled, porous, or cellular mass in which the starch granules are all broken up or disrupted substantially throughout the mass and being soluble or emulsifiable in water.

One preferred method of producing my new adhesive is as follows, reference being had to the accompanying drawings, which indicate, by way of example, two kinds of apparatus which may be employed in carrying out the process forming part of my invention.

In the drawings, Figure 1 represents a glass tube wherein my process may be carried out, while Fig. 2 represents a metal cylinder for the same purpose.

I take ordinary commercial laundry starch B in a substantially air-dry condition and place it into glass tubes A, which are hermetically sealed. These tubes are now rapidly heated to a temperature of about 200° centigrade, the heating occupying the time of from ten minutes to half an hour. The tubes are heated in an oven capable of being raised to the temperature stated or in any other well-known and suitable manner. After having been heated to the desired extent for the desired time the glass tubes are removed from the oven or other heating agent and broken open before any cooling takes place. By this procedure the starch masses are swelled up into a porous mass somewhat resembling elder-pith. On examining the swelled starch mass microscopically it will be found that the granules of the same have all been burst or broken up, so as to lose their spherocrystalline structure. The degree of temperature and the length of heating are governed to a great extent by the character of the material employed and the size of the lumps or pieces, as will be readily understood. I have found that I can obtain very good results by sealing Irish-potato starch hermetically in tubes and heating them for a period of about twenty minutes from 130° to 175° centigrade. Upon then suddenly breaking open these tubes I find that the starch will at once swell into a porous dry mass, which when placed in water forms an excellent paste which is at once ready for use. Cold or hot water may be used. When using the starch in the shape of lumps, it will be found that these lumps retain their original shape, but are very much increased in size, occupying from two to twenty times their original volume, depending upon the amount of heat applied and the time during which the same has been applied. If the starch is treated in a powdered form, the resultant product will be in the shape of a continuous mass.

In carrying out this process with lumps or pellets of substantially pure starch the lumps or pellets will have a tendency to stick together when they are not projected so rapidly from their containing vessel that they are sufficiently spread apart. This is due to a film or coating of dextrine and probably intermediate products between the starch and the dextrine, often grouped under the name "soluble starch," which is formed on the outside of these lumps or pellets. This glutenous coating of the starch lumps or pellets thus treated and which is also formed on the continuous mass of porous starch formed under my process protects the interior of the same against the admission of moisture and keeps the same sterile, thereby preserving it indefinitely until the same is to be used.

In carrying out my process all of the varieties of commercial starches—that is to say, substantially pure starches—may be employed, such as wheat-starch, corn-starch, Irish-potato starch, sago-starch, sago-flour, and tapioca-flour and arrow-root starch.

I may avail myself of various descriptions of apparatus for producing my new dry adhesive material. Thus, for example, I may use the glass tubes hereinbefore described when carrying out my process in a small way. When carrying out my invention on a more extensive scale, I employ suitable metallic vessels in the form of air-tight cylinders C, provided with removable heads D, which are fitted on air-tight by suitable packings or otherwise. These are partly filled with the starch masses to be treated and then after having been hermetically closed by screwing on the removable heads are thrust into an oven of a temperature sufficient to raise the contents of the cylinders to the required temperature with sufficient rapidity. For example, the temperature of the oven may vary between 125° to 300° centigrade and the time during which the vessel is retained in the oven may vary from ten to forty-five minutes. The exact temperature must be determined according to the nature of the material being treated. After having thus been subjected to heat the cylinders are quickly removed from the oven and the cylinder-heads are immediately taken off, when the material will immediately swell into the enlarged, porous, and altered condition above described, this swelling being in most cases so rapid and of such an extent that the material is projected out of the cylinder.

If desired, other means for applying the gas-pressure to the starch to be treated may be employed—for example, by compressing air into the vessel containing the material during the application of heat to such vessel. In this case the hermetical sealing of the vessel is not important, provided the leakage of air is not greater than the air-compressing mechanism can meet and still maintain the desired pressure. I may also employ an apparatus such as described in United States Patent No. 20,077, of August 3, 1858, to A. S. Lyman.

When using the pure starch material in the form of small grains or lumps—such as are embodied, for example, in what is known as "pearl sago"—the resultant spongy pellets or lumps if care has been taken to prevent them from adhering to each other will prove a very suitable and convenient article of stationary, since they may be used for fastening sheets of paper together in place of the adhesive wafers or other paper-fasteners heretofore employed for this purpose. All that is necessary for this purpose is to dip such pellet or lump of dry adhesive into water or otherwise moisten it and then insert it between the corners of the two sheets of paper to be secured together and pressing the said sheets upon the interposed pellet. These pellets will keep for any length of time and are always ready for use and avoid much of the inconvenience experienced with the use of the ordinary mucilage or paste receivers hitherto employed for this purpose. These pellets or lumps may also be compressed or flattened out to form small thin disks or wafers of any shape, in which form they will be very convenient as paper-fasteners.

It is essential to my process that the starches treated are submitted to substantially dry pressure or to gas-pressure in a substantially air-dry condition while being heated and that the pressure is removed suddenly at the end of the process. Both of these features are essential to obtaining the dry porous adhesive hereinbefore described. If the starch material is in a wet condition or the pressure is not suddenly removed, entirely and radically different results will follow.

It is to be observed that while the best results are perhaps obtained under my process if the material to be treated is in an absolutely air-dry condition considerable latitude may be allowed in this respect. Thus, for example, if the starch be kiln-dried, so as to remove a portion of the liquid contained in the starch granules in the air-dried state, the process will still be operative, although not leading to so good a result and so great a swelling effect as when all the liquid is allowed to remain. On the other hand, a small amount of moisture in addition to the liquid either in the granules of the starch or in the gas pressing on the starch during the heating stage will not interfere with my process. The fact that such latitude in both directions is allowed without departing from my invention as claimed I have expressed by stating that the starch is to be "substantially air-dry." It is also to be noted that a certain amount of moisture or vapor in the gas pressing upon the material above the amount necessary for saturation will not prevent the result above described from being obtained. However, it is preferable to work with a strictly dry gas—that is, one whose amount of water is not above the saturation-point. In employing the term "substantially dry pressure" in the claims I desire to be understood as covering a dry pressure or any pressure approximating such dry pressure so nearly as to bring about my result, though, perhaps, in a less degree. The pressure must be reduced with such suddenness as to produce the explosive effect described on the starch granules. The nearer the reduction of pressure can be brought to instantaneous the better, although there is here also a certain latitude as to the degree of suddenness with which the pressure is reduced or relieved may be allowed. In construing the term "suddenly reducing the pressure" as employed in the claims it is therefore to be understood any rapidity of reduction of pressure which will result in the explosive effect described is comprehended under said term.

In order to make pastes from starches under the old method, it is of course necessary that they should be in an extremely fine condition, so that when heated with water they become emulsified or go into suspension and become to a certain extent soluble, in which case the starch has been changed into dextrine and intermediate products between dextrine and dextrose. The dextrines have been used extensively as pastes; but the ordinary commercial dextrines are either soluble in the true sense of the term, in which they form a fluid or watery liquid which requires too long a time in drying, or when the dextrines have been insufficiently heated or treated, which is often the case, the starch granules present in such dextrines are still intact and form a thick uneven gummy mass not easily applied nor containing the maximum adhesive properties of the starches. By my method of dry treatment, &c., the granules are broken up into infinitesimally-minute particles and form with water an emulsion, &c., in which these minute starch-granule particles retain their adhesive properties on drying and are also fine enough to penetrate in between the fibers of the paper, cloth, &c., to which the adhesive is applied. Together with these minute soluble-starch particles there are also formed soluble dextrines, which also add to the adhesive qualities of air-dry paste. In fact, the treatment can be prolonged, in which case more dextrines are formed. In that case, however, the dry paste becomes colored somewhat or browned. The pure-white dry-paste stage is the most desirable.

The new starch product made under my invention is distinguished by the following characteristics: The starch granules of the same are disrupted or broken up substantially throughout its entire mass. It is cellular or spongy in structure, the cell walls or membranes of the new cellular structure thus formed being formed of the debris or remains of the original starch granules of the starch cemented together by the dextrines formed from a part of such remains in the expanding process. It is compressible and somewhat elastic and readily dissolves or emulsifies in water at ordinary temperature. As stated above, it is, moreover, coated with a smooth, continuous, and unbroken glaze of dextrine, &c., which effectively protects its interior against moisture and keeps it sterile indefinitely. It is generally white, although in the case of prolonging the heating process and forming more dextrines it will become more or less yellow or browned.

In order to use the starch as prepared under my invention for making pastes and sizes, it is simply necessary to add to it a suitable amount of cold water, in which it will readily emulsify to such an extent as to approach to and present the appearance of a solution if enough water is used. It is then ready for use. Of course, if desired, hot water may be also employed for this purpose. The dry prepared starch will keep indefinitely and is always ready for use.

In my Patent No. 707,892, dated August 26, 1902, and granted on an application pending concurrently herewith, I have described and claimed a process for treating starch materials generally by subjecting the same in an air-dry condition to heat and pressure, as above described. I do not, therefore, claim such process in this application, since the present invention is directed to the new product from substantially pure starch, as described, and the preparation of the new paste.

While I have herein described in further illustration of my invention a flattened piece of starch material having a porous cellular structure and in which the starch granules are disrupted, I do not herein claim the same specifically, since the same forms the subject-matter of my claims in application Serial No. 133,284, filed November 29, 1902.

Having thus fully described my invention, what I claim as new, and desire to secure by Letters Patent, is—

1. As a new article of manufacture, a dry spongy mass made from substantially pure starch and having substantially all of its starch granules disrupted.

2. As a new article of manufacture, a dry spongy mass made from substantially pure starch having substantially all of its starch granules disrupted and coated with a protecting surface glaze.

3. As a new article of manufacture, a dry spongy mass made from substantially pure starch having the following characteristics: the starch granules of the same are disrupted substantially throughout its mass, the remains of the same forming the new cell-walls of the new article, it has a protecting surface glaze and readily emulsifies in water at ordinary temperatures.

4. As a new article of manufacture, a dry white spongy mass made from substantially pure starch and having the following characteristics: the starch granules of the same are disrupted substantially throughout the mass, the remains of the same forming the new cell-membranes of the new article; it has a protecting surface glaze and is readily emulsifiable in water at ordinary temperatures.

5. An adhesive fastener consisting of a dry spongy lump made from substantially pure starch, the starch granules of which are substantially all disrupted, the remains of the same forming the new cell-membranes of the spongy lump, said lump being readily emulsifiable in water at ordinary temperatures.

6. An adhesive fastener consisting of a dry spongy lump made from substantially pure starch, the starch granules of which are substantially all disrupted, the remains of the same forming the new cell-membranes of the spongy lump, said lump being readily emulsifiable in water at ordinary temperatures, the said lump being coated with a protecting surface glaze.

In testimony whereof I affix my signature in presence of two witnesses.

ALEXANDER PIERCE ANDERSON.

Witnesses:
D. F. MacDougal,
F. S. Earle.